United States Patent [19]

Boski

[11] Patent Number: 4,529,330

[45] Date of Patent: Jul. 16, 1985

[54] CYLINDER CONNECTION

[75] Inventor: Israel Boski, Plano, Tex.

[73] Assignee: Otis Engineering Corporation, Dallas, Tex.

[21] Appl. No.: 658,621

[22] Filed: Oct. 9, 1984

Related U.S. Application Data

[62] Division of Ser. No. 509,345, Jun. 30, 1983, Pat. No. 4,491,060.

[51] Int. Cl.³ .............................................. F16J 10/02
[52] U.S. Cl. ........................................ 403/2; 92/128;
92/169; 403/348; 285/91
[58] Field of Search .................... 285/2, 3, 4, 91, 376,
285/401; 403/2, 348, 349, DIG. 3; 92/169 R,
128, 130 R; 91/416, 391 R; 251/63.5, 63.6

[56] References Cited

U.S. PATENT DOCUMENTS

| 786,353 | 4/1905 | Gabriel | 403/DIG. 3 |
| 2,610,820 | 9/1952 | Markel et al. | 285/91 |
| 2,643,581 | 6/1953 | Wehrenlennig | 403/349 |
| 3,138,073 | 6/1964 | Whitehouse | 92/169 R |
| 3,401,604 | 9/1968 | Blatt et al. | 91/416 |
| 4,064,953 | 6/1976 | Collins | 285/3 |

Primary Examiner—Paul E. Maslousky
Attorney, Agent, or Firm—Roland O. Cox

[57] ABSTRACT

A cylinder for a valve actuator wherein the cylinder body has lugs connectable to and disconnectable from like cylinder head lugs by less than one turn rotation. Resilient seals seal the head to the body when connected, and the connection is releasably lockable.

6 Claims, 4 Drawing Figures

CYLINDER CONNECTION

This application is a division of copending application Ser. No. 509,345, filed June 30, 1983, now U.S. Pat. No. 4,491,060.

This invention pertains to cylinder type actuators which reciprocate valves between open and closed positions. More specifically, this invention pertains to a connection useful in connecting an actuator cylinder head to a cylinder body.

Small diameter cylinder bodies and cylinder heads for valve actuators are usually cast in one piece. Larger cylinders, such as shown on pp. 14 and 15 of the "Otis Surface Safety Equipment and Services" catalog OEC-5115A and in U.S. Pat. No. 3,378,224 to W. G. Boyle, herein incorporated for reference, are usually fabricated by welding the cylinder head to the cylinder body. Long welds applied around large cylinders to connect heads to bodies and before and after weld procedures used to prevent stresses in weld material are very expensive. As valve actuator cylinders must hold internal operating pressures of up to 1500 psi on occasion, further expensive quality control procedures after welding are required, such as radiographic weld inspection and pressure testing each welded cylinder. If heat treatment is required, the weld material sometimes does not respond the same as material used for the cylinder body or head, resulting in expensive rework or possible scrapping of the welded cylinder.

The present invention provides a means for pressure tight connection of cylinder head to cylinder body, requiring less than one turn to connect and disconnect and no welding. Lugs extending from the head are positioned between lugs extending from the body. The head is rotated engaging the lugs and connecting the head to the body. The connection is pinned connected by frangible pins installed in a hole through the cylinder head into a lug on the cylinder body. Resilient seals seal the head to the body when connected. The cylinder head may be readily disconnected and removed from the body, leaving the body connected to the valve, providing access from the top end of the body to internal actuator parts for repair.

An object of this invention is to provide an improved means of connecting an actuator cylinder head to the cylinder body not requiring welding.

Another object of this invention is to provide an improved cylinder head-body connection quickly connectable and disconnectable by rotation.

Also an object of this invention is to provide an improved cylinder head-body connection which may be releasably locked when connected.

Figure 1:
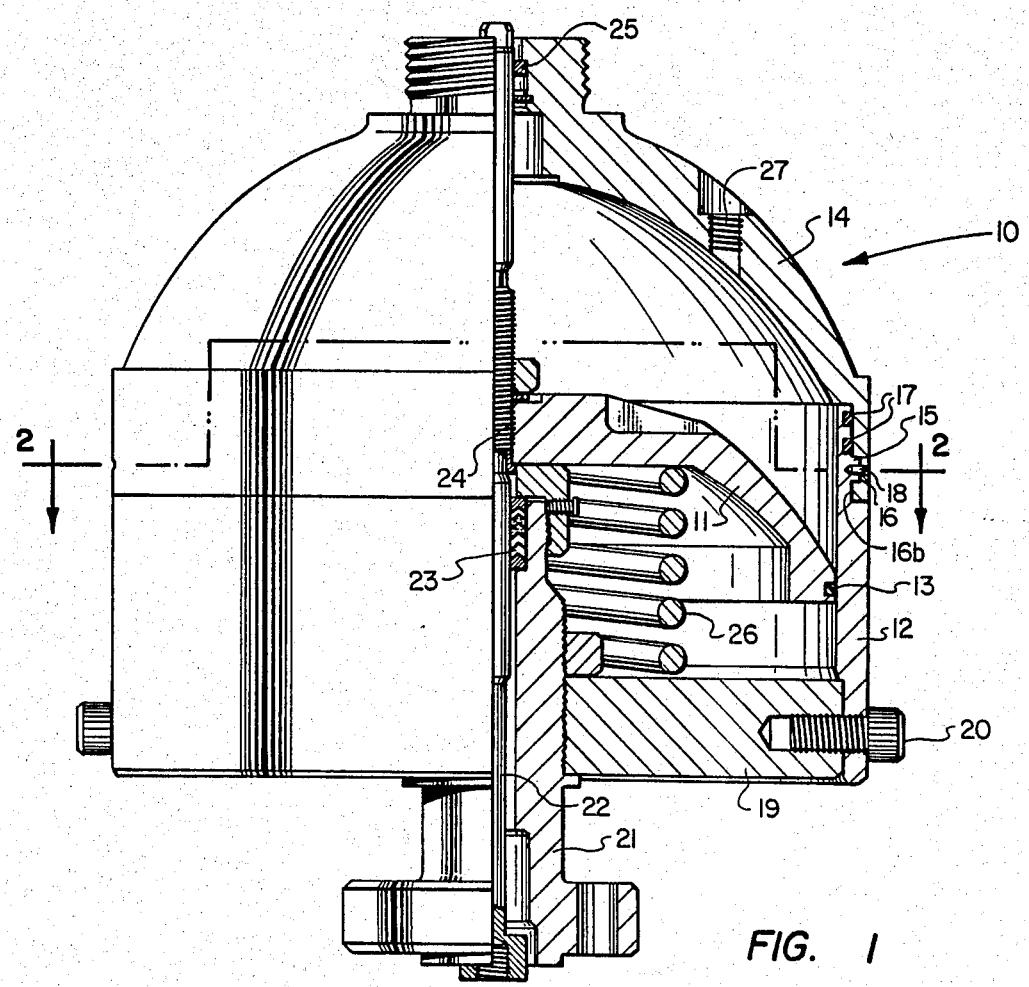
FIG. 1 is a half-sectioned elevation drawing of a valve actuator wherein the cylinder head is shown connected and locked to the cylinder body according to the preferred embodiment to this invention.

FIG. 1 shows a valve actuator assembly 10 having a piston 11 mounted for reciprocating movement and slidably sealed in the bore of a cylinder body 12 by resilient seal 13. The cylinder head 14 is connected to the cylinder body by lugs 15 extending from the body and engaging cylinder head lugs 15h. Resilient seals 17 in grooves around the body seal the cylinder head to the body, and pins 18 releasably lock the head and body connected. The cylinder body is connected to a bonnet flange 19 with bolts 20. The bonnet flange is threadedly connected to a bonnet 21, and connectable on its lower end to the body of the valve (not shown) to be operated by the actuator. A stem 22, connectable on its lower end to the valve element of the valve to be operated, extends through packing 23 slidably sealing the stem in the bonnet. The stem is threadedly connected to the piston at 24 and extends through upper stem packing 25, which slidably seals the stem to the cylinder head. A spring 26 is provided biasing the piston upwardly. A threaded hole 27, in the cylinder head, is provided for connection to a remote pressure source and admission of pressured operating fluid into the cylinder and on the piston.

To operate a valve, the actuator stem is connected to the valve element and the actuator bonnet is connected to the body of the valve to be operated. Fluid pressure in the cylinder on the piston, sufficient to move the piston downwardly and compress the spring, moves the actuator stem and connected valve element downwardly, operating the valve. Reduction of cylinder fluid pressure allows the compressed spring to move the piston, stem and valve element upwardly to the valve element up position.

Figure 2:
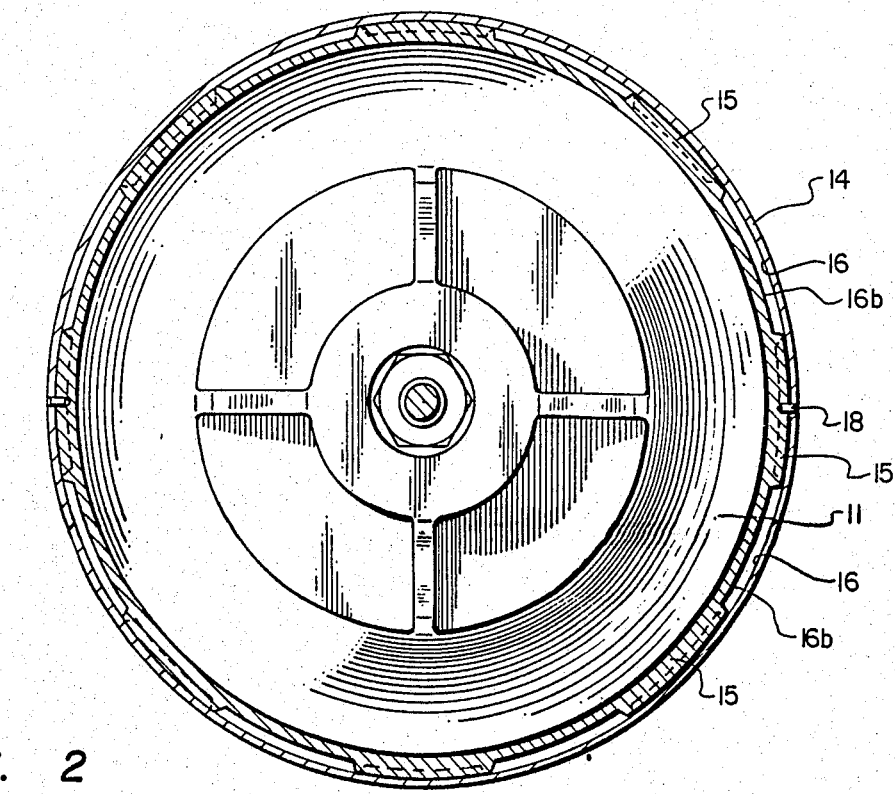
FIG. 2 is a section along line 2—2 of FIG. 1.
Figure 3:
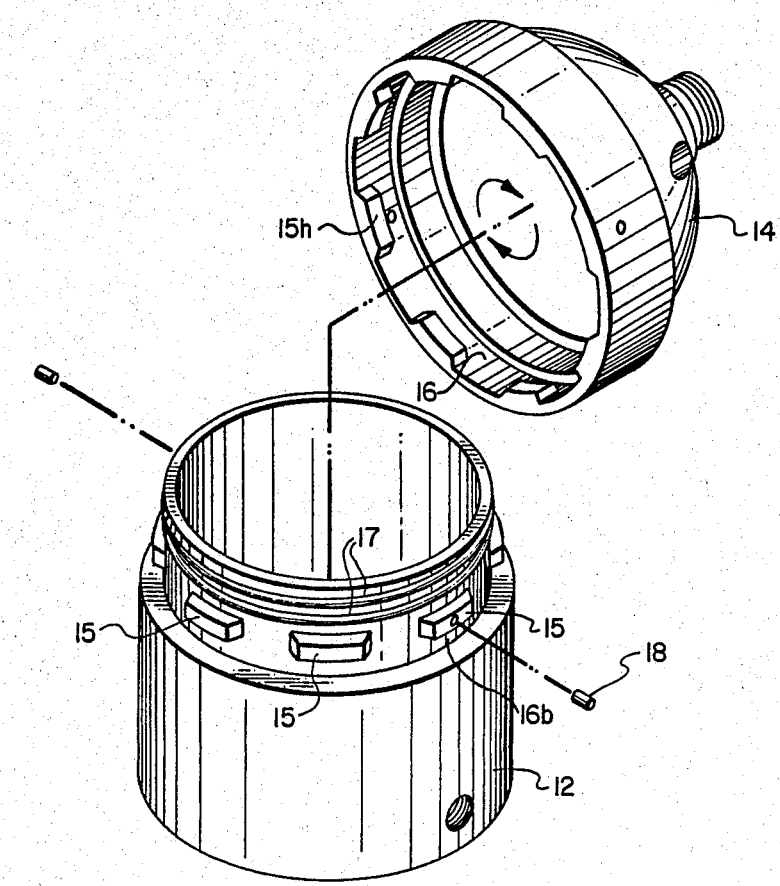
FIG. 3 is an exploded view of the cylinder head and body of FIG. 1.

The preferred embodiment of the invention cylinder body-head connection is shown in FIGS. 1, 2 and 3. During manufacture of the cylinder body 12, the male portion of the connection is formed near the upper body end by cutting a groove 16b adjacent a turned flange which is formed into eight equal width lugs 15 extending outwardly by cutting equal width segments from the flange as shown in FIGS. 2 and 3. Grooves for resilient seals 13 are cut between the lugs 15 and the cylinder body upper end. During manufacture of the cylinder head 14, the female portion of the connection is formed near the larger head end by cutting an internal groove 16 and forming a flange, adjacent the lower head end, which is formed into eight lugs 15h, extending inwardly, by cutting equal but slightly wider than lug 15 segments from the head flange as shown in FIG. 3. As the widths of the head lugs 15h extending inwardly are slightly less than the widths of the body lugs 15 extending outwardly, the head lugs when aligned between body lugs and lowered, will pass between the body lugs until the lower end of the head engages the lower side of groove 16b. The head is now rotated one-eighth turn, moving each lug 15h in groove 16b into full engagement under lugs 15, connecting the cylinder body and head. The connection is releasably locked by installing pins 18 as shown. The connection may be unlocked by applying sufficient turning torque to the head to shear pins 18 and disconnected by rotating the head one-eighth turn to position head lugs between body lugs and lifting the head.

Figure 4:
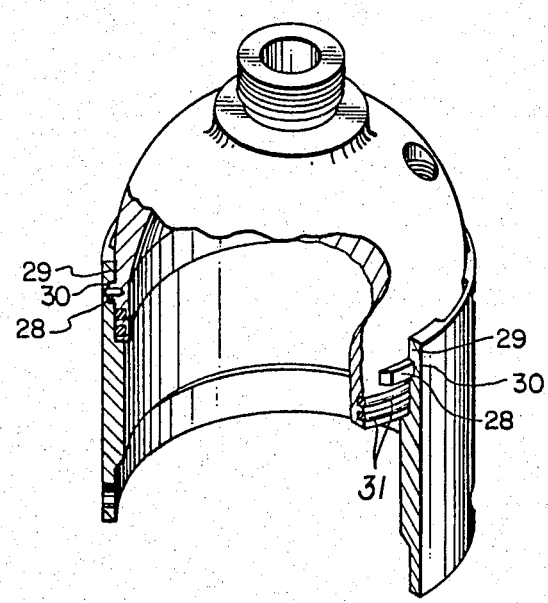
FIG. 4 is an isometric view of another embodiment of this connection invention.

FIG. 4 shows another embodiment of this connection invention wherein the male portion of the connection is formed on the cylinder head with outwardly extending lugs 28 and the female portion is formed in the cylinder body having inwardly extending lugs 29 and groove 30 therein. Lugs 28 will pass through spaces between lugs 29. The embodiment of FIG. 4 is engaged, rotated to connect, releasably locked with pins and disconnected the same as the preferred embodiment, earlier described. This connection is sealed with resilient seals 31.

For both embodiments of the invention connection, two or more equal width segment cuts from the flange for the male connection producing lugs equal in width to the cut width and an equal number of slightly wider than male lug segment cuts from the flange for the female connection member producing an equal number of lugs may be used. More lugs formed on male and female connection members require more machining, but reduce the degrees rotation for full lug-on-lug engagement and connection and disconnection of the cylinder head and body.

Other applications for the connections of this invention may be envisioned by those skilled in the art.

What is claimed is:

1. A connection for connecting a cylinder head to a cylinder body comprising:
    a. two or more equal width lugs extending outwardly near one end of the cylinder body with spaces between lugs equal in width to the width of said lugs, connectable to an equal number of equal width lugs extending inwardly from one end of the cylinder head with spaces between head lugs slightly wider than the width of said body lugs;
    b. means sealing said head to said body when connected; and
    c. frangible means releasably locking the cylinder head and body connected.

2. The connection of claim 1 wherein said means sealing the cylinder head to the cylinder body includes at least one resilient seal, disposed in a groove around the cylinder body between the body lugs and the upper end of said body and sealingly engageable in a bore in said head.

3. The connection of claim 1 wherein the frangible means are at least one pin, installed through a hole in the cylinder head, protruding into a hole in a cylinder body lug.

4. A connection for connecting a cylinder head to a cylinder body comprising:
    a. two or more equal width lugs extending outwardly near the lower end of the cylinder head with spaces between lugs equal in width to the width of said lugs, connectable to an equal number of equal width lugs extending inwardly from one end of the cylinder body with spaces between body lugs slightly wider than the width of said head lugs;
    b. means sealing said head to said body when connected; and
    c. frangible means releasably locking the cylinder head and body connected.

5. The connection of claim 4 wherein said means sealing the cylinder head to the cylinder body includes at least one resilient seal, disposed in a groove around the head between the end of the head and the lugs thereon and sealingly engageable in a bore in the cylinder body.

6. The connection of claim 4 wherein the frangible means are at least one pin, installed through a hole in the cylinder body, protruding into a hole in a cylinder head lug.

* * * * *